United States Patent [19]
Williams et al.

[11] 3,852,667
[45] Dec. 3, 1974

[54] PROBE FOR ELECTROSTATIC VOLTMETER

[75] Inventors: Bruce T. Williams, Lockport;
Clarence R. Hare, Barker, both of N.Y.

[73] Assignee: Trek Inc., Gasport, N.Y.

[22] Filed: May 10, 1973

[21] Appl. No.: 359,004

[52] U.S. Cl. ................................................ 324/72
[51] Int. Cl. ........................................... G01r 31/02
[58] Field of Search ................ 324/32, 72; 317/246

[56] References Cited
UNITED STATES PATENTS

| | | | |
|---|---|---|---|
| 3,336,529 | 8/1967 | Tygart | 324/173 |
| 3,406,334 | 10/1968 | Marquart et al. | 324/32 |
| 3,525,936 | 8/1970 | Vosteen | 324/72 |
| 3,611,127 | 10/1971 | Vosteen | 324/72 |
| 3,729,675 | 4/1973 | Vosteen | 324/72 |

*Primary Examiner*—Alfred E. Smith
*Assistant Examiner*—Rolf Hille
*Attorney, Agent, or Firm*—Christel & Bean

[57] ABSTRACT

A probe or sensor for an electrostatic voltmeter including a voltage sensitive electrode which is vibrated or oscillated within a housing and in a direction to vary the amount of a surface of the electrode which is exposed through an opening or viewing aperture in the housing to an external electrical potential being measured. The electrode is connected to one tine of a tuning fork which is oscillated or vibrated when a driving signal is applied to a piezoelectric transducer on the fork. An electrical conductor which connects the electrode to the voltmeter circuitry is provided with an electrically driven shield, and a reference potential is applied to the housing surface surrounding the viewing aperture, to enhance the accuracy of measurement.

15 Claims, 11 Drawing Figures

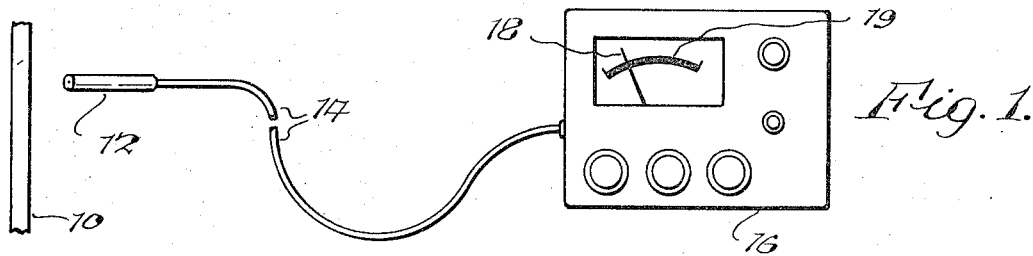
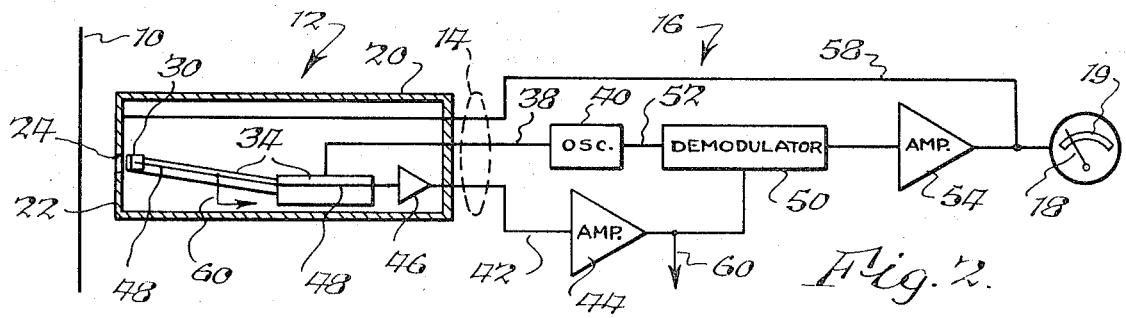
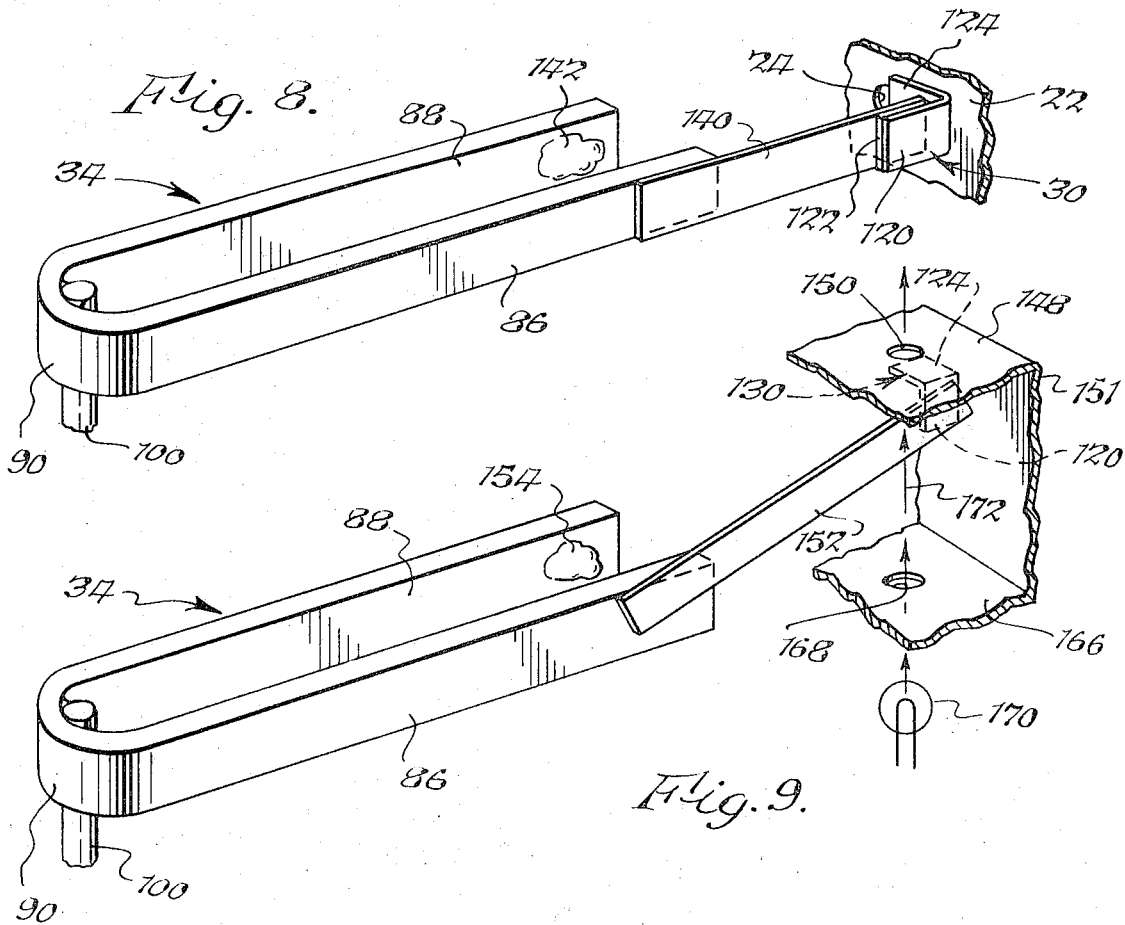

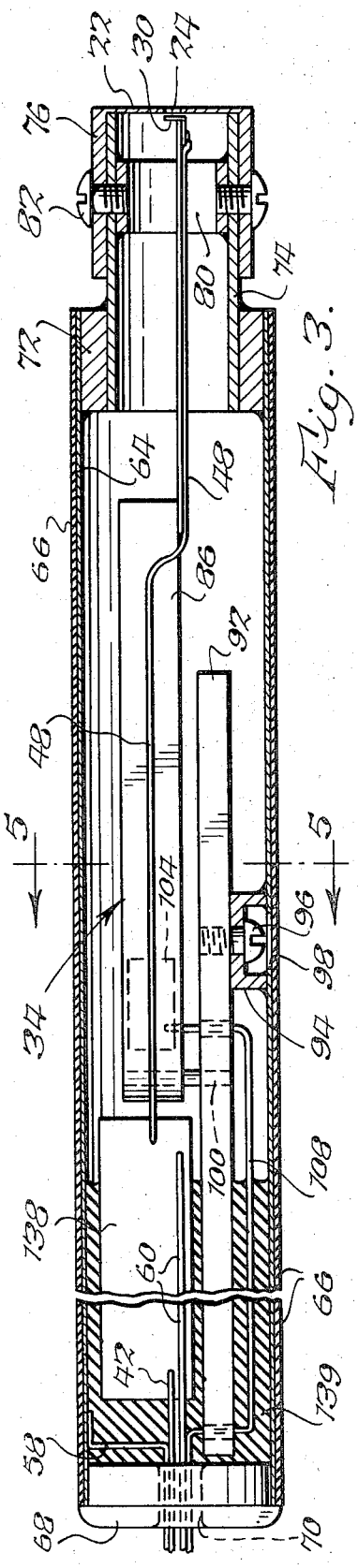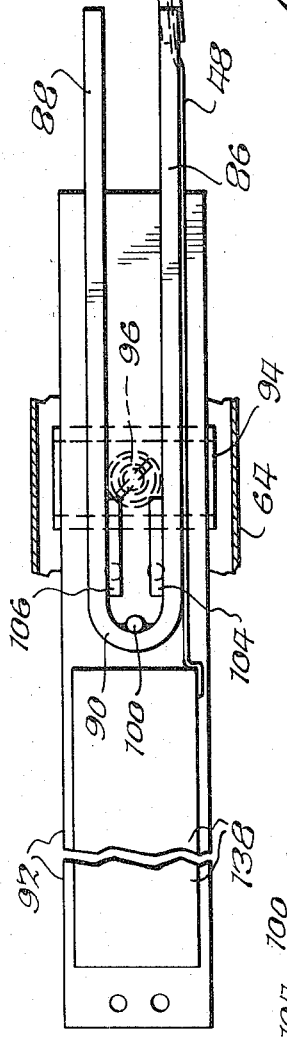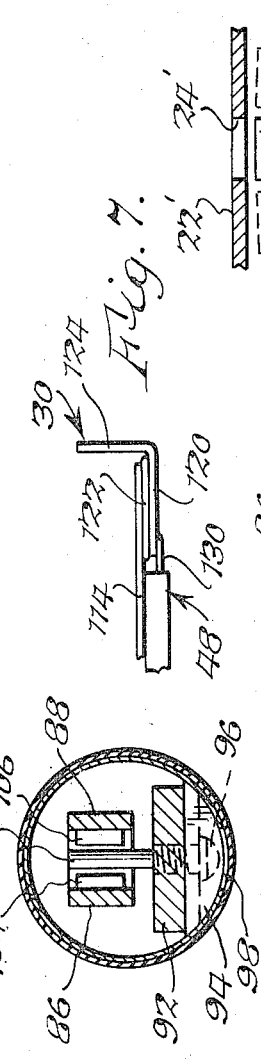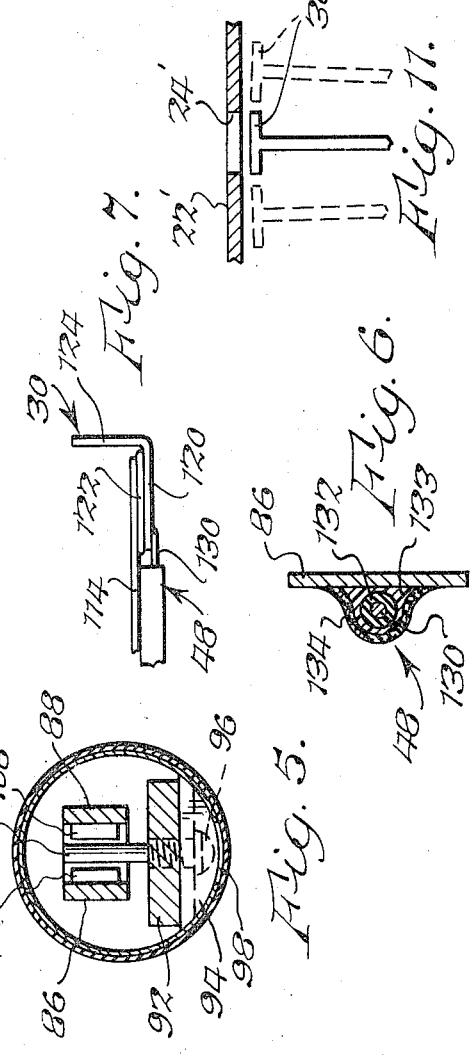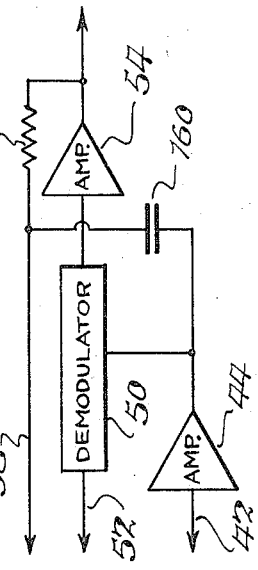

PROBE FOR ELECTROSTATIC VOLTMETER

BACKGROUND OF THE INVENTION

This invention relates to the electrical measurement art, and more particularly to a new and improved sensor for electrostatic voltmeters.

In the application of any voltage or potential measurement technique, consideration must be given to the electrical loading effects of the measuring apparatus. In certain applications, the use of any technique which causes current to flow through the measuring instrument, no matter how small the flow, will modify or destroy the data. The undesirable current flow may be in the form of a voltage over resistance current or a current flowing to charge an input capacitance, or both.

An instrument which measures electrostatic fields and electrostatic potentials of surfaces without current flow is known as an electrostatic voltmeter which makes measurements in a non-contacting manner. These instruments comprise a probe or sensor assembly and an associated voltmeter wherein the probe converts the electrostatic field or surface potential to an a.c. voltage, the magnitude of which is proportional to the field or potential being measured. This conversion is accomplished by a capacitance modulation process wherein the capacitive coupling between a surface associated with probe and a surface associated with the field or potential to be measured is modulated or varied at a fixed periodic rate. A voltage difference existing between the two surfaces will induce an a.c. voltage on the probe surface.

Some prior art probe assemblies employ a chopper type capacitor detector wherein a mechanical chopper, for example in the form of a rotating plate defining a series of apertures, is utilized to vary the capacitive coupling. In another type of probe assembly, an element defining a surface within the probe is moved by a motion generator toward and away from the external surface associated with the field or potential to be measured to vary the spacing or distance between these surfaces along a line perpendicular to the external surface to vary the capacitive coupling. In these prior art assemblies, the interceding chopping element or the fact that an element is moved toward and away from the external field or potential in a manner always exposing the same amount of the element to the field or potential, impose limitations on the resulting capacitance modulation efficiency. Furthermore, many prior probe constructions by their very nature cannot be made in a relatively small size.

SUMMARY OF THE INVENTION

It is, therefore, an object of this invention to provide a new and improved sensor for electrostatic voltmeters.

It is a more particular object of this invention to provide such a sensor which is of the capacitance modulation type and yields a high modulation efficiency.

It is a further object of this invention to provide a sensor for electrostatic voltmeters which has a high degree of resolution while maintaining a high efficiency.

It is a further object of this invention to provide a sensor for electrostatic voltmeters which will allow light or other radiation to be applied to the surface under measurement from a path through the body of the sensor without disturbing the electrical characteristics of the system thereby permitting simultaneous measurement and radiation of the test surface.

It is a further object of this invention to provide such a sensor which is relatively rugged yet simple in construction and which is convenient and economical to manufacture and maintain.

The present invention provides a probe or sensor for an electrostatic voltmeter comprising a voltage sensitive electrode which is vibrated or oscillated within a probe housing in a direction to vary the amount of an operative surface of the electrode which is exposed through an opening in the housing to an external electrical potential being measured. The capacitive coupling between the electrode operative surface and the external potential is varied at the rate of vibration of the electrode whereby an alternating voltage is induced on the electrode having an amplitude proportional to the amplitude of the external electrical potential being measured. An electrical conductor connecting the electrode to circuitry of the voltmeter system is provided with an electrically driven shield and a reference potential is applied to the housing surface surrounding the opening to enhance the accuracy of measurement.

The foregoing and additional advantages and characterizing features of the present invention will become apparent upon a reading of the ensuing detailed description together with the included drawing wherein:

BRIEF DESCRIPTION OF THE DRAWING FIGURES

FIG. 1 is an elevational view with parts removed of an electrostatic voltmeter provided with a sensor according to the present invention;

FIG. 2 is a diagrammatic view of a sensor according to the present invention and showing the electrical connection thereof in an electrostatic voltmeter system;

FIG. 3 is a longitudinal section of a sensor according to the present invention;

FIG. 4 is a fragmentary plan view of the elements of the apparatus shown in FIG. 3;

FIG. 5 is a sectional view taken about on line 5—5 of FIG. 3;

FIG. 6 is a cross-sectional view of a portion of the apparatus shown in FIG. 3;

FIG. 7 is a fragmentary elevational view of a portion of the apparatus shown in FIG. 3;

FIG. 8 is a fragmentary side elevational view, greatly enlarged, showing a portion of the apparatus according to another embodiment of the present invention;

FIG. 9 is a fragmentary side elevational view, greatly enlarged, showing a portion of the apparatus according to another embodiment of the present invention;

FIG. 10 is a schematic block diagram of an alternative arrangement of a portion of the apparatus shown in FIG. 2; and FIG. 11 is a fragmentary plan view, greatly enlarged, showing a portion of the apparatus according to another embodiment of the present invention.

DETAILED DESCRIPTION OF THE ILLUSTRATED EMBODIMENTS

FIG. 1 illustrates an electrostatic voltmeter for measuring the electrostatic field or electrostatic potential associated with a surface 10. The electrostatic voltmeter comprises a probe or sensor 12 which during measurement is placed in proximity to but not in contact with the surface 10 undergoing the measuring process. Probe 12 is connected by an electrical cable 14 to appropriate circuits within a meter assembly 16 including an indicator dial 18 and scale 19 from which the value or magnitude of the measured electrostatic field or potential is read.

A probe or sensor 12 according to the present invention is illustrated diagrammatically in FIG. 2 and comprises a housing 20 which in preferred form is hollow cylindrical in shape. Housing 20 includes an operative surface 22 of a material capable of holding or retaining an electrical potential applied thereto, preferably of electrically conducting material, and provided with an opening or aperture 24 therethrough. In the present instance surface 22 is one end face or surface of the cylindrical housing 20, but the operative surface can be located elsewhere on the housing as will be explained hereafter. The opposite end surface of housing 20 is closed and provided with an opening or openings for passage thereto of electrical leads which will be described in detail presently.

Probe 12 further comprises a voltage sensitive electrode 30 having an operative surface disposed toward the probe operative surface 22 and opening 24 therein. Electrode 30 is fixed to a vibrator means 34 in the form of an electro-mechanical transducer which, in turn, is secured within housing 20. When a driving signal is applied to transducer 34 it operates to vibrate electrode 30 at a vibratory frequency and amplitude determined by the frequency and amplitude of the driving signal and by the mechanical characteristics of transducer 34. Electrode 30 is vibrated or moved alternately in a direction to vary the amount of the electrode operative surface which is exposed through opening 24 to surface 10 bearing the external electrical field or potential being measured. In particular, the operative surface of electrode 30 is disposed in a plane generally parallel to the plane of opening 24 in probe operative surface 22 and is vibrated in that plane. The operative surface of electrode 30 is moved into and out of registry with at least a portion of opening 24, and electrode 30 is moved between a position wherein a maximum portion of the operative surface is exposed to a position wherein a minimum, preferably none, of the operative surface of electrode 30 is exposed during each vibratry cycle thereof, as will be explained in detail presently. While opening 24 preferably is circular, it can have other shapes such as elliptical or oval, rectangular, square, etc.

Cable 14 includes a conductor 38 connecting the output of an oscillator 40 to the transducer 34 for applying a driving or energizing signal thereto. Cable 14 includes another conductor 42 which connects an input of an amplifier 44 to the output of a pre-amplifier 46 located within housing 20. Oscillator 40 and amplifier 44 are located physically in meter assembly 16. A conductor 48 connects the input of pre-amplifier 46 to sensitive electrode 30 and is supported on and carried by transducer 34 in a manner which will be described in detail presently. The output of amplifier 44 within meter 16 is connected to one input of a demodulator or detector 50 which is synchronized with the operation of oscillator 40 as indicated by the line 52 connecting these two components. The output of detector 50 is connected to the input of an amplifier 54 the output of which is connected to a meter or indicator 56 from which the field or potential being measured can be read according to the position of dial 18 relative to scale 19. The output of amplifier 54 also is connected by a conductor 58 which is included within cable 14 to operative surface 22 of housing 20. As a result, a reference potential substantially equal to the electrical potential being measured is applied to surface 22. Conductor 48 between electrode 30 and pre-amplifier 46 is provided with a shield of a material capable of holding or retaining an electrical potential, and a conductor 60 connects the output of amplifier 44 to the shield around conductor 48. This results in a driven shield system which greatly reduces or eliminates any capacitive shunting of the induced signal on sensitive electrode 30 to electrical ground. Conductor 60 would be included in cable 14. Conductors 38, 42 and 58 are shown in FIG. 2 extending through separate openings or apertures in the end surface of housing 20 for convenience in illustration, whereas a single opening ordinarily will be provided in housing 20 for cable 14 whereupon the conductors extending from cable 14 are connected to the various components of probe 12.

FIGS. 3–7 show a preferred construction for probe 12 according to the present invention. Housing 20 comprises an inner sleeve or tube 64 of electrically conducting material such as brass and an outer tube or sleeve 66 of electrically insulating material such as epoxy. By way of illustration sleeve 64 preferably has a length of 2 9/16 inch and an outer diameter of 11/32 inch, and sleeve 66 has a length of 2 19/32 inch with an outer diameter of three-eighths inch. The end of housing 20 through which cable 14 extends can be closed in various ways, one being in the form of an end plug 68 shown at the left-hand end of FIG. 3. Plug 68 can be secured by suitable cement in the end of sleeve 64 and is provided with a central axial bore or passage 70 through which the conductors of cable 14 can pass.

The opposite end of housing 20 is provided with a sleeve 72 of relatively short axial length. Sleeve 72 is of electrically conducting material, and preferably of the same material as tube or sleeve 64 which in the present instance is brass. Sleeve 72 is fitted in the end of sleeve 64 so that the end faces of the two parts are substantially contiguous or flush and then is welded or soldered in position. By way of illustration, the axial length of sleeve 72 is three-sixteenths inch and the outer diameter thereof is five-sixteenths inch. Housing 20 further comprises a tube or sleeve 74 which is fitted snugly within sleeve 72 and is of sufficient axial length to extend beyond the exposed end of sleeve 72. In particular, sleeve 74 is positioned in sleeve 72 so that the end surfaces of these two parts within sleeve 64 are substantially flush, and sleeve 74 is of sufficient axial length so as to extend beyond the exterior end faces of sleeve 72 and tubes 64 and 66 at the right-hand end of housing 20 as viewed in FIG. 3. Sleeve 74 then is soldered or welded in position. By way of illustration, sleeve 74 is of electrically conducting material, preferably brass, and has an axial length of thirty five-sixty fourths inch and an outer diameter of one-fourth inch. Housing 20 is completed by a cap member 76 which is hollow cylindrical in shape, open at one end so that it may be fitted onto sleeve 74, and closed at the other end thereby defining the housing operative surface 22 which is provided with an aperture or opening 24 therein. Cap member 76 also is of electrically conducting material, preferably brass, having an outer diameter of nine thirty-seconds inch and an axial length of five-sixteenths inch. According to a preferred mode of the present invention, the end wall or surface 22 has a thickness of 0.005 inch, and aperture 24 has a diameter of 0.031 inch and can be formed or machined by a No. 68 drill. Cap 76 is releasably or detachably connected to sleeve 74 in the following manner. A sleeve or ring member 80 is secured within sleeve 74, such as by welding, and oppositely directed holes are provided through the wall of cap 76, sleeve 74 and sleeve 80. Screws 82 then are threaded into the apertures to connect cap 76 onto sleeve 74. When cap 76 is to be removed, such as during cleaning or maintenance of probe 12, screws 82 are removed and cap 76 is pulled from the sleeve 74.

Vibrator means 34 comprises an electromechanical transducer in the form of a tuning fork having first and second spaced-apart tines or prongs 86 and 88, respectively, which are joined at one end by a body portion 90 which is integral with the tines 86 and 88. According to an illustrative mode of the present invention, the overall length of the tuning fork 34 from the outer end or edge of body 90 at the far left-hand end as viewed in FIGS. 3 and 4 to the tip of either tine 86 or 88 at the far right-hand end of the fork as viewed in FIGS. 3 and 4 is 1 1/32 inch. Tuning fork 34 is secured or mounted in housing 20 in the following manner. A base plate member 92 of generally elongated rectangular shape is mounted in housing 20 by means of a channel-shaped bracket 94 which is welded or soldered to sleeve 64 at approximately mid-way along the axial length thereof, and a screw or similar fastener 96 is threaded through the yoke or base of the channel-shaped bracket 94 into an aperture provided in base plate 92. Sleeve 64 is provided with an aperture or opening 98 permitting access to screw 96 for installation of the assembly. As a result, base plate 92 is supported within sleeve 64 and is disposed in a plane parallel to the longitudinal axis of tube 64. A pin or rod 100 is secured to fork body 90 such as by welding or soldering, and rod 100 is securely fitted into an aperture provided in base plate 92 and can be welded or soldered therein. Rod 100 is of sufficient length so that in the completed assembly fork 34 is spaced a small distance away from the adjacent surface of plate 92. By way of illustration, plate 92 preferably is 1 ⅞ inches long, one-fourth inch wide and one-sixteeth inch thick. The axis of fastener 96 is spaced one-half inch from the right-hand end of plate 92 as viewed in FIGS. 3 and 4, and the axis of rod 100 is located three-fourths inch from the same end of plate 92.

Tuning fork 34 is driven or oscillated by piezoelectric means in the form of a first crystal element 104 secured such as by soldering to the one tine 86 of fork 34 and a second crystal element 106 similarly secured to the other tine 88 of fork 34. The quartz piezoelectric crystal elements 104 and 106 are located on their respective tines adjacent tuning fork body 90. According to a preferred mode of the present invention, crystal 104 is the driving element and is connected by a lead 108 of conductor 38 shown in FIG. 2 connected to the output of oscillator 40 whereby a driving signal is applied to crystal element 104. Crystal 106 is the driven or sensing element which is connected by a lead (not shown) of conductor 38 to an appropriate part of the input of the oscillator to complete a feedback loop to sustain the oscillation according to well-known feedback control principles readily apparent to those skilled in the art.

The apparatus of the present invention further comprises means for connecting sensing electrode 30 to the vibrator means 34. In the present instance, a reed member 114 in the form of a relatively thin elongated strip of metal such as brass is secured such as by soldering or welding at one end thereof to tine 86 of tuning fork 34 and extends therefrom in a direction so that the other end thereof is adjacent opening 24 of housing surface 22. Reed 114 is disposed in a plane parallel to the direction in which reed 114 and electrode 30 will be moved or vibrated by tuning fork 34 during operation of the apparatus. In other words, reed 114 is disposed as to be relatively stiff in the direction of vibration or oscillation, and the direction of vibratory or oscillatory movement is indicated by arrow 116 in FIG. 4. In preferred form reed 114 has a width of about 0.040–0.042 inch and a thickness of about 0.005 inch.

Sensitive electrode 30 is secured to the outer end of reed 114 in a manner illustrated in detail in FIG. 7. Sensitive electrode 30 is of electrically conducting material, preferably of metal such as brass, and has the form of a right angle member with a thickness of about 0.005 inch. One right angle leg or portion 120 of electrode 30 is secured by means of electrically insulating epoxy cement 122 to the end of reed 114. Leg 120 is secured to the lower or underside of reed 114 as viewed in FIGS. 3 and 4. The other leg or right angle portion 124 of electrode 30 comprises the operative surface of electrode 30 and is disposed toward opening 24 in surface 22. According to a preferred mode of the present invention, surface 124 is approximately 0.03 inch by 0.03 inch in size. When the assembly is completed, the distance from the outer surface of leg 124 to the tip of tine 86 is eleven-sixteenths inch, and surface 124 is positioned within 0.002 inch to 0.005 inch of the inner surface of housing portion 22 having opening 24. Lead 130 of conductor 48 is soldered to portion 120 of electrode 30 and is directed along the reed 114 and along tine 86 and is secured to both reed 114 and tine 86 in the following manner. As shown in FIG. 6, lead 130 of conductor 34 is surrounded by a layer 132 of electrical insulation in a conventional manner which, in turn, is secured to reed 114 and tine 86 by means of insulating epoxy material 133. Wire 130 and its insulation 132 are embedded in the material 133. Then the insulating material 133 is covered with conductive paint or conductive epoxy material 134, for example copper epoxy, which provides an electrical shield system which will be described in detail presently. Conductor 48 extends along the outer surface or edge of tine 86 whereupon it enters a housing or capsule 138 which contains preamplifier 46 shown in FIG. 2 together with an appropriate input gate biasing network for the amplifier. In the present instance conductor 60 also extends into housing 138 wherein electrical connection is made to the conductive shield 134 provided on conductor 48. An alternative connection will be described further on in the specification. Conductor 42 from the output of preamplifier 46 leaves housing 138 whereupon it becomes part of cable 14 extending from probe housing 20. Conductor 58 is connected such as by soldering or welding to the surface of tube or sleeve 64 as shown in FIG. 3. Conductors 42, 58, 60 and 108 are contained in cable 14 which connects probe 12 with voltmeter 16 as shown in FIGS. 1 and 2. When the assembly is completed, potting compound 139 can be introduced to the left-hand end of housing 20 as viewed in FIG. 3, such as by holding housing 20 upright and introducing the compound from the other end, which potting compound 139 provides electrical insulation as well as additional mechanical stability for base plate 92 and capsule 138.

The apparatus of the present invention operates in the following manner. In the initial or rest position of sensitive electrode 30 and vibrator means or a tuning fork 34, that is when no driving signal is applied to tuning fork 34, operative surface 124 of electrode 30 is positioned such that a minimum amount of the surface is exposed through opening 24 to an external surface such as surface 10 associated with the field or potential being measured. In particular, electrode 30 is initially positioned so as to cover approximately one-fourth to one-half of the surface of opening 24, preferably one-half. In other words, surface 124 of electrode 30 is exposed to or in registry with approximately one-half of the viewing aperture or opening 24. In this position, electrode 30 will have a capacitive coupling to any surface placed in front or ahead of opening 24, such as test surface 10 shown in FIGS. 1 and 2, as well as a capacitance to surface 22 of the probe housing 20. Assume that a voltage of sufficient magnitude and polarity is applied to tuning fork 34, in particular applied to piezoelectric crystal 104 by means of conductor 108, to cause the tine 86 of tuning fork 34 and reed 114 to move electrode 30 directly over opening 24. In this position a maximum portion of surface 124 of electrode 30 is exposed through opening 24 to a surface such as surface 10 associated with the field or potential to be measured. In this position, the capacitive coupling between electrode 30 and surface 10 is a maximum while the capacitive coupling between electrode 30 and surface 22 will be a minimum. If an equal magnitude but opposite polarity voltage is applied to piezoelectric element 104, this will cause the tine 86 of tuning fork 34 and reed 114 to move electrode 30 in the opposite direction by an amount sufficient to place surface 124 out of registry with opening 24. In other words, electrode 30 is moved to a point where the capacitive coupling between electrode 30 and surface 10 will be a minimum, i.e., none, while the capacitive coupling between electrode 30 and surface 22 of probe 12 will be a maximum. When the voltage applied to piezoelectric element 104 goes to zero, electrode 30 returns to the initial or rest position.

Oscillator 40 in the system of FIG. 2 applies an a.c. voltage through conductors 38 and 108 to piezoelectric crystal 104 which voltage has an amplitude corresponding to the magnitude of the signals mentioned above so that voltage sensitive electrode 30 is driven between the two mechanical situations which yields minimum and maximum values of capacitive coupling between electrode 30, external or test surface 10, and surface 22 of the probe housing during each cycle. According to a preferred mode of the present invention, the frequency of the alternating voltage together with the mechanical characteristics of tuning fork 34 are such that fork 34 and reed member 114 are oscillated or vibrated in the range of 600 to 800 herz. As fork 34 oscillates the motion thereof generates a voltage in piezoelectric crystal 106 attached to tine 88 which is fed back electrically to oscillator 40 to complete a feedback loop to sustain the oscillation. In particular, the signal fed back representative of the actual vibration or oscillation is compared with a reference signal representative of desired vibration or oscillation, e.g., the amplitude and frequency to control the output of oscillator 40. This is done in a manner readily apparent to those skilled in the art of feedback control systems so that any further detailed description is believed to be unnecessary.

Assume for the purpose of explanation that surface 22 of probe 12 is at electrical ground or zero potential in reference to any voltage applied to or existing on test surface 10. If no voltage exists between surface 22 and surface 10, there will be no voltage induced on electrode 30 as it is oscillated or vibrated between its limits of capacitive coupling between surface 22 and surface 10. If a voltage difference does exist there will be an a.c. voltage induced on electrode 30. The amplitude of the induced voltage will be proportional to the magnitude of the difference voltage while the phase of the induced voltage in reference to the driving signal applied to tuning form 34 will depend upon the polarity of the voltage difference. The voltage induced on electrode 30 is connected or transmitted by conductor 48 to the input of preamplifier 46 located within prove 12. Preamplifier 46 is of the high impedance type in the form of an F.E.T. type transistor stage with a gate to source protective zener network to protect against voltage transients. Preamplifier 46 serves to reduce the impedance level necessary to drive the probe cable 14, i.e., to transmit the alternating signal containing the information relative to the measured voltage or potential to the circuitry in voltmeter 16.

The signal output from preamplifier 46 present on conductor 42 is amplified by amplifier 44 which is of the unitary gain type, the output of which then demodulated by demodulator 50 to produce a d.c. output voltage which is proportional to the amplitude of the alternating signal. This d.c. signal then is amplified by amplifier 54 and applied to a suitable meter 56 whereby the magnitude of the measured voltage or potential can be read from the position of dial 18 relative to scale 19. The output of amplifier 44 can be connected by conductor 60 to conductor 48, specifically to conductive shield 134 of conductor 48 with the result that a voltage or potential relatively close to the induced voltage on electrode 30 shields conductor 48. This prevents or minimizes any capacitive shunting of the induced signal on wire 130 to electrical ground. To achieve a high degree of accuracy, the output of amplifier 54 is connected by conductor 58 to housing operative surface 22. Thus, a voltage is applied to surface 22 having a magnitude substantially equal to the potential of the voltage being measured.

FIG. 10 illustrates an alternative arrangement for connecting the output of amplifier 44 to the conductive shield 134 of conductor 48. Shield 134 is in electrical contact with tine 86 of tuning fork 34 which through pin 100, plate 92 and bracket 94 is electrically connected to the brass tube 66 of housing 20 as shown in FIGS. 3 and 4. Tube 66 is connected electrically through parts 72, 74 and 76 to housing operative surface 22. The arrangement of FIG. 10 provides an a.c. coupling of the output of amplifier 44 to conductor 58 which is electrically connected to surface 22, the latter being electrically connected to conductive shield 134 as explained above. The arrangement of FIG. 10 includes a capacitor 160 connected between the output of amplifier 44 and line 58, and a resistor 162 connected in line 58 between the connection to capacitor 160 and the output of amplifier 54. The result of this connection is to reduce the capacitance between wire 130 and every surface contained in housing 20 and the housing itself while allowing the average or d.c. potential of the housing 20, and therefore surface 22, to be controlled by amplifier 54.

Probe or sensor 12 according to the present invention is constructed so that vibrator means 34 operates to vary the amount of the operative surface 124 of sensitive electrode 30 which is exposed through viewing aperture or opening 24 to an external potential or field being measured in a manner providing a relatively large change in capacitive coupling. This in turn results in a relatively high capacitance modulating efficiency. In particular, electrode 30 is moved between a position where a minimum amount of the electrode surface 124 is exposed to where a maximum amount of the electrode surface 124 is exposed during each vibratory or oscillatory cycle of the apparatus. In particular, electrode surface 124 is exposed to none of the surface area of aperture 24 at the minimum position and exposed to the entire area of aperture 24 at the maximum position. As a result, the capacitive coupling varies from a small, almost zero value to a maximum value which provides a relatively large conversion gain and therefore a relatively high level of capacitance modulation efficiency. The conversion gain is defined in terms of the magnitude of the d.c. field or potential of surface 10 being measured to the a.c. signal induced on electrode 30.

The probe 12 of the present invention includes a relatively small size sensitive electrode 30 and aperture 24 in housing operative surface 22 together with a relatively small magnitude of the drive voltage required to oscillate fork 34 so as to provide a system having capacitive coupling to only a small area on an external surface such as test surface 10 thereby creating a probe having high resolution while still maintaining high efficiency. In other words a high degree of resolution is achieved without any significant reduction in the gain of probe 12. Furthermore, in the probe of the present invention the sensing electrode 30 can be positioned relatively close to the surface having the potential or field being measured. In particular, electrode 30 itself is vibrated or oscillated, there being no interceding chopping element, so that operative surface 124 of electrode 30 can be positioned relatively close to the inner surface of housing portion 22 having viewing aperture 24, for example within about 0.002 to 0.005 inch thereof. The spatial resolution of the probe or sensor is defined as the diameter of the minimum voltage spot required to cause the voltmeter to indicate 95 percent of the voltage applied to the spot. The diameter of the probe aperture and the probe to test surface distance determine probe resolution, which with probe 12 of the present invention is extremely high.

The probe or sensor 12 of the present invention is relatively simple in construction and convenient and economical to manufacture and maintain. The construction of housing 20 is relatively rugged and serves effectively to protect the components therein. The probe 12 can be mounted in any position and can be clamped anywhere along its length to facilitate mounting. The probe is mechanically stable and is not subject to microphonics or any other malfunction due to shock. To clean or maintain electrode 30, cap 76 is easily removed by screws 82 from housing 20 permitting access to electrode 36 and reed 114.

FIGS. 8 and 9 illustrate alternative arrangements for vibrating or oscillating sensitive electrode 30 according to additional embodiments of the present invention. In the arrangement of FIG. 8 the vibrator means comprises tuning fork 34 having tines 86, 88 and a body 90 secured or mounted by pin 100 in a manner identical to the arrangement of FIGS. 3 and 4. Sensitive electrode 30 has the same form including an operative surface portion 124 disposed toward opening 24 in housing surface 22. Electrode 30 is connected to tine 86 by an elongated reed 140 which is disposed in a plane perpendicular to the direction of motion of tine 86 and electrode 30 so as to be relatively flexible in the direction or plane of motion. Reed 140 is of a mechanical construction so that it resonates at a frequency approximately equal to, in particular slightly greater than, the resonant frequency of tuning fork 34. In particular, reed 140 comprises a strip of spring steel having a length of approximately 3/8 inch, a width of approximately 0.062 inch and a thickness of approximately 0.005 inch. Conductor 48 is secured to electrode 30 and extends along reed 140 and tine 86 in a manner identical to that of the arrangement of FIGS. 3 and 4. A weight 142 in the form of a mass or mound of solder or similar balancing material is attached to tine 88, the amount being adjusted during testing to obtain the proper mass on tine 88 to offset the effect of having added the mass of reed 140 to the other tine 86. After adjustment, the combination of tuning fork 34, reed 140 and electrode 30 resonates at about 650 herz. The vibratory or oscillatory mechanical motion has a relatively higher amplitude for a relatively lower amplitude of the required electrical driving or excitation signal thereby increasing the efficiency thereof.

The embodiment of FIG. 9 adapts the arrangement of FIG. 8 to a probe wherein the viewing or sensing aperture is located on the side rather than on the end of the probe. In particular, a housing operative surface 148 is provided with an opening 150 and is located on the side of the probe housing, the end of the probe housing being indicated at 151 where it meets the adjacent surface 148. Surface 148 thus is disposed generally parallel to the longitudinal axis of the probe. The probe contains a vibrator or tuning fork 34 including tines 86, 88, body 90 and mounting pin 100 which is identical to fork 34 of the previous embodiments. A reed 152 identical in shape, size and material to reed 140 of FIG. 8 connects a voltage sensitive electrode 130 to tine 86. In particular, electrode 130 has a first right-angle leg or portion secured such as by cement to the end of reed 152 and a second right-angle leg or portion including operative surface 124 disposed toward opening or viewing aperture 150. Whereas reed 140 in FIG. 8 is disposed generally parallel to the longitudinal axis of tine 86, reed 154 in the present instance is disposed at an angle, in particular at a small upwardly directed angle as viewed in FIG. 9, to the longitudinal axis of tine 86. As a result, sensitive electrode 130 can look out the side of the probe body through viewing aperture 150. Reed 152 resonates at a frequency approximately equal to, in particular slightly greater than, the resonant frequency of fork 34. An adjustment weight or mass 154 is placed on tine 88 in the same manner as in the embodiment of FIG. 8, and after adjustment the combination of tuning fork 34, reed 152 and electrode 130 resonates at about 650 herz. The vibratory or oscillating mechanical motion has a relatively higher amplitude with a relatively smaller magnitude electrical driving signal thereby increasing the efficiency thereof.

FIG. 9 also illustrates an embodiment of the present invention which allows light or other radiation to be applied to the surface under measurement from a path through the body of probe or sensor 12 without disturbing the electrical characteristics of the system. As a result, the test surface can be measured and irradiated simultaneously. The surface will provide an electrical field or potential in repsonse to irradiation. One area of use of this embodiment of the present invention is in determining the electrical properties of an electrophotographic surface. These properties are determined from the values of electric field or potential measured by the electrostatic voltmeter when the surface is illuminated. Referring now to FIG. 9, the probe or sensor includes means defining a path for radiation to travel from the interior of the probe housing through the viewing aperture in the housing operative surface and onto the test surface undergoing measurement. In the present instance the probe housing includes a housing surface 166 which is disposed opposite surface 148 and which is provided with an opening or aperture 168 located so that at least a portion of opening 118 is in alignment or in registry with at least a portion of opening 150 in housing operative surface 148. As a result, a source of radiation in the form of light source 170 can be positioned external to the probe housing in alignment with the aligned openings 168 and 150 so that light rays indicated by the arrows 172 in FIG. 9 travel along a path through the probe housing, the path being defined by openings 168 and 150, and onto the surface being measured, i.e., a surface similar to surface 10 shown in FIG. 1.

In the present illustration surfaces 148 and 166 are parallel and meet surface 151 at right angles, but openings 168 and 150 could be located at opposite wall surface portions of a cylindrical housing. While openings 168 and 150 are oppositely located so that at least portions thereof are in alignment or in registry with each other, it may be possible in some applications through the use of light-conducting fiber optic deivces to have the openings out of alignment. Similarly, it may be practical in some applications to incorporate the light source within the probe housing. Accordingly, this arrangement for irradiating the test surface may also be employed in probes or sensors where the viewing aperture is located in the end of the probe housing.

In the arrangement of FIG. 9, if electrode surface 124 moves from exactly full exposure to opening 150 to exactly zero exposure to opening 150 during each vibratory cycle, then exactly one-half of the radiation from source 170 traveling through the probe housing will be applied to the test surface. This occurs when the portion 124 of electrode 130 is of opaque metal. On the other hand, portion 124 can be of a transparent conductive coated material such as Nesa glass in situations where it is necessary to have all of the radiation from source 170 applied to the test surface.

FIG. 11 illustrates an alternative arrangement of the initial or rest position of the sensitive electrode relative to the aperture or opening in the housing operative surface. This arrangement advantageously provides a relatively high gain with relatively low noise, and it is particularly desirable in a probe or sensor of high resolution wherein the area of theprobe opening or viewing aperture is reduced in size.

Referring now to FIG. 11, the initial or rest position is with the voltage sensitive electrode 30' positioned in full or complete registry with opening 24' in housing operative surface 22'. In other words, the operative surface of sensitive electrode 30' is exposed to the external surface being measured, such as surface 10 of FIGS. 1 and 2, through the entire area of opening 24'. The driving signal applied to the tuning fork has sufficient magnitude to move electrode 30' completely out of registry with opening 24' so that it is hidden from or not exposed to the external surface being measured. In particular, during each cycle of the alternating signal applied to the tuning fork, sensitive electrode 30' is moved from the initial or rest position first to a position where it is hidden from the external surface or potential, for example the broken line position at the left as viewed in FIG. 11, then back through the resting position and to a position where it is again hidden from the external surface, for example the broken line position at the right as viewed in FIG. 11, and then back to the resting position. The frequency of the signal induced on sensitive electrode 30' is equal to twice the frequency of the tuning fork driving signal because electrode 30' is exposed to and concealed from the external surface or potential twice during each vibratory cycle of the tuning fork. As a result of the doubled frequency of the induced signal on electrode 30', the rate of change of the capacitive coupling to electrode 30' is also doubled and therefore the gain of the probe or sensor also is doubled, as compared to the situation where the sensitive electrode is exposed to and concealed from the external surface or potential once during each vibratory cycle of the tuning fork.

In a high resolution probe or sensor where the area of the opening or viewing aperture is reduced in area, the amplitude of the motion required of the tuning fork to move sensitive electrode 30' the required distance according to this mode becomes practical. The signal induced on electrode 30' is demodulated relative to a signal which is equal to twice the frequency of oscillation of the tuning fork and synchronous with it. It is then possible to filter out noise signals such as microphonics, stray coupling, etc, which are generated in the probe at the tuning fork frequency. This results in a greatly enhanced signal-to-noise ratio in a high resolution probe.

It is therefore apparent that the present invention accomplishes its intended objects. While several embodiments of the present invention have been described in detail, this is for the purpose of illustration, not limitation.

We claim:

1. A sensor for an electrostatic voltmeter comprising:

a. a housing including an operative surface having an opening therein;
  b. a voltage sensitive electrode having an operative surface disposed toward said opening; and
  c. vibrator means in said housing to vibrate said electrode in a direction generally transversely of said opening to vary the amount of said electrode operative surface which is exposed through said opening to an external electrical field or potential being measured, said vibrator means comprising a generally elongated element having a resonant mechanical vibration characteristic, electro-mechanical driver means adapted to be converted to an electrical signal source and operatively connected to said element adjacent one end thereof and means to connect said electrode to said element adjacent the other end thereof;

d. whereby the capacitive coupling between said electrode operative surface and the external field or potential being measured is varied as a function of the rate of vibration of said electrode whereby an alternating voltage is induced on said electrode having an amplitude proportional to the amplitude of the external electrical field or potential being measured.

2. Apparatus according to claim 1, wherein said electrode operative surface is disposed in a plane substantially parallel to the plane of said opening and said electrode is vibrated in said plane.

3. Apparatus according to claim 1, wherein said electrode is moved between a position where a minimum portion of said electrode surface is exposed to a position where a maximum portion of said electrode surface is exposed during each vibratory cycle thereof.

4. Apparatus according to claim 1, wherein said electrode is moved between a position where said electrode surface is out of registry with the area of said opening to a position where said electrode surface is in registry with the entire area of said opening during each vibratory cycle thereof.

5. Apparatus according to claim 1, wherein said housing operative surface is of a material capable of holding an electrical potential, and further including means to apply a reference potential substantially equal to the electrical potential bring measured to said housing operative surface.

6. Apparatus according to claim 1, further including:

a. insulated electrical conductor means for connecting said electrode to circuit means for providing an indication of the magnitude of the electrical potential being measured;
b. a shield surrounding said conductor and being of a material capable of holding an electrical potential; and
c. means to apply a signal substantially identical to the signal induced on said electrode to said shield.

7. A sensor for an electrostatic voltmeter comprising:

a. a housing including an operative surface having an opening therein;
b. a voltage sensitive electrode having an operative surface disposed toward said opening; and
c. vibrator means in said housing to vibrate said electrode in a direction generally transversely of said opening to vary the amount of said electrode operative surface which is exposed through said opening to an external electrical field or potential being measured, said vibrator means comprising a tuning fork, means to connect a tine of said tuning fork to said electrode, and piezoelectric means mechanically connected to said tuning fork and adapted to be connected to an electrical signal source for oscillating said tuning fork;

d. whereby the capacitive coupling between said electrode operative surface and the external field or potential being measured is varied as a function of the rate of vibration of said electrode whereby an alternating voltage is induced on said electrode having an amplitude proportional to the amplitude of the external electrical field or potential being measured.

8. Apparatus according to claim 7, wherein said means to connect said tuning fork tine to said electrode comprises a reed member disposed so as to be relatively stiff in the direction of vibration.

9. Apparatus according to claim 7, wherein said means to connect said tuning fork tine to said electrode comprises a reed member disposed so as to be relatively flexible in the direction of vibration.

10. Apparatus according to claim 9, wherein said reed member has a mechanical resonant frequency substantially equal to the mechanical resonant frequency of said tuning fork.

11. Apparatus according to claim 1 wherein said housing is elongated and said operative surface is at one end thereof generally perpendicular to the longitudinal axis of said housing.

12. Apparatus according to claim 1, wherein said housing is elongated and said operative surface is on a side thereof and disposed generally parallel to the longitudinal axis of said housing.

13. Apparatus according to claim 1, further including means in said housing for defining a path for light or other radiation to travel from the interior of said housing through said opening in said housing operative surface whereby the electrical field or potential of an external surface sensitive to said light or other radiation can be measured.

14. Apparatus according to claim 1, further including another opening in a surface of said housing spaced from said operative surface, said openings being at least partially in alignment, whereby light or other radiation from an external source can be directed through said housing and onto an external surface which gives rise to an electrical field or potential when irradiated.

15. Apparatus according to claim 1, wherein the initial or rest position of said electrode is where said electrode surface is in registry with said opening and wherein said vibrator means moves said electrode surface into and out of exposure through said opening to said external electrical field or potential twice during each vibratory cycle thereof.

* * * * *